Nov. 5, 1957     F. D. BRADDON     2,812,026
VARIABLE PITCH PROPELLER CONTROL SYSTEM
Filed Jan. 18, 1954
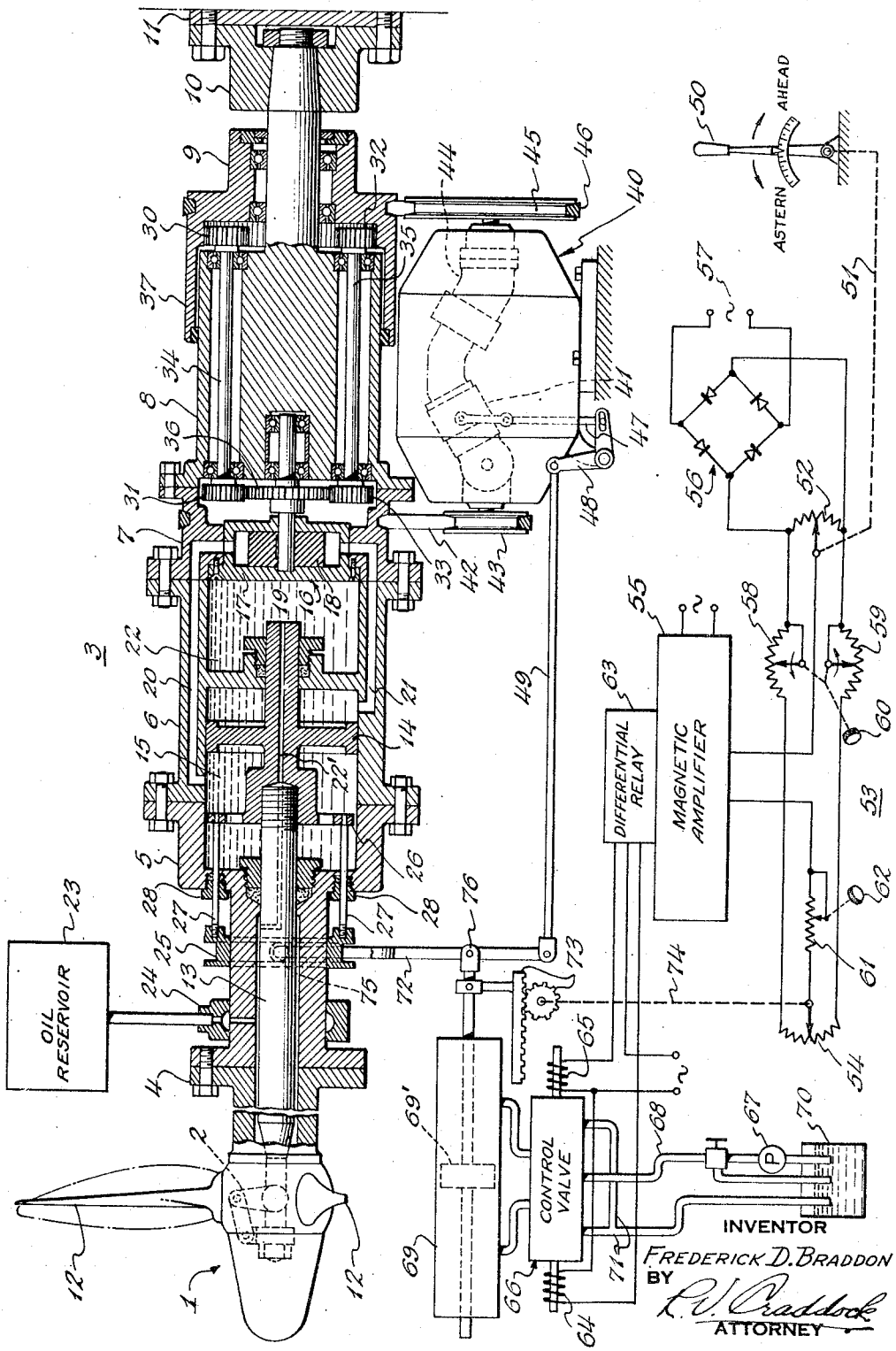
INVENTOR
FREDERICK D. BRADDON
BY
*L. V. Craddock*
ATTORNEY United States Patent Office 2,812,026
Patented Nov. 5, 1957

2,812,026

VARIABLE PITCH PROPELLER CONTROL SYSTEM

Frederick D. Braddon, Babylon, N. Y., assignor to Sperry Rand Corporation, a corporation of Delaware Application January 18, 1954, Serial No. 404,663

3 Claims. (Cl. 170—160.18)

This invention relates to systems for controlling the pitch of the blades of variable pitch propellers and, particularly, to improvements in power actuating and regulating devices for such systems as applied in the field of marine propulsion.

In recent years the widespread application of diesel engines and gas turbines to the propulsion of ships has emphasized the advantages of controllable pitch propeller systems for use in conjunction therewith. Inasmuch as power plants of these types function most efficiently at constant speed and in one direction, the advantages of changing propeller pitch instead of engine speed to effect changes in ship's speed or reversals in ship's direction of travel are readily apparent and have been widely discussed.

Heretofore a variety of controllable pitch propeller systems have been proposed. In many instances such systems comprise a variable pitch or adjustable blade propeller mounted on a hollow drive shaft actuated by a hydraulic piston within the drive shaft. The piston is connected through shafts and/or linkages to the propeller blades, and is positioned by an external hydraulic pump and valve system through hydraulic rotating joints. In other instances, the piston is positioned by an hydraulic pump housed within the drive shaft and driven by an electric motor which is also mounted in the drive shaft and energized through electrical slip rings from an external electrical power source. Although these devices perform adequately for the purposes intended, they are limited in their applications primarily because of structural problems. For example, with externally located hydraulic pump and valve systems, the hydraulic pressure that can be transmitted through rotating hydraulic joints is necessarily relatively low. As a result, it is essential to increase the shaft size prohibitively in order to increase the effective area of the actuating piston to thereby develop the high thrusts required for pitch changing operations. The systems employing electrical slip rings are inherently disadvantageous because of corrosion and fouling of the contact surfaces in a corrosive salt atmosphere.

The principal object of the present invention is to provide a controllable pitch propeller system or apparatus in which the hydraulic portions of the pitch changing mechanism are fully enclosed in the drive shaft, thereby eliminating the need for hydraulic slip rings. A further object of the invention is to provide a system that may be operated at very high hydraulic pressures, thereby minimizing the required overall diameter of the drive shaft. A further object of the invention is to provide a controllable pitch propeller system that may conveniently be operated from a remote wheelhouse control station. A further object of the invention is to provide a controllable pitch propeller system in which the actuating power for the pitch changing mechanism is derived directly from the drive shaft without need of an intermediate power source.

Still another object of the present invention is to provide a variable pitch propeller system which is relatively simple in construction and which can be readily disassembled for inspection and servicing.

These objects are attained, in conjunction with a conventional pitch changing or pitch-setting mechanism, by providing a reversible hydraulic pump in the drive shaft driven differentially relative to the drive shaft to effect pitch changing motions by means of a planetary gear system mounted on the drive shaft and having its output connected to drive the pump, the planetary gear system being operated through a variable speed device which in turn derives its power directly from the propeller drive shaft. In the arrangement illustrated, the direction and extent of pitch changes are controlled by a manually operated or manually settable controller or lever located on the ship's bridge or in the wheelhouse and is effective to control the operation of the variable speed device.

A preferred form of the invention is shown in the single figure on the accompanying sheet of drawings in which a conventional variable pitch propeller assembly 1 including a conventional pitch-setting mechanism or linkage 2 is mounted on a drive shaft 3. The drive shaft 3 comprises a plurality of interconnected, drive shaft sections 4, 5, 6, 7, 8, 9, and 10, the latter section being connected to a drive shaft section 11 driven from the ship's prime power source or power plant (not shown) at preferably substantially constant speed. Change in the pitch of the propeller blades 12 is effected by means of an internal translatable section or actuating rod 13 which is mounted for reciprocating movement within the propeller shaft 3 and particularly within sections 4, 5 and 6 thereof. Shaft 13 is connected at the propeller end thereof to the pitch-setting mechanism or linkage 2 whereby translation of shaft 13 will produce a corresponding change in the pitch of the propeller blades 12. At its other end, rod 13 is connected to a piston 14 mounted for reciprocating movement in a high-pressure, oil-filled cylinder 15 arranged within the propeller shaft 3 and formed by shaft sections 5 and 6. Piston 14 is positioned by means of an hydraulic pump 16 which may be of any convenient and conventional type and is shown herein as a reversible, fixed displacement, vane-type pump having a housing 17 secured in drive shaft section 7 and an impeller 18 keyed on a shaft 19 journalled in the housing 17 and in drive shaft section 8. Impeller 18, when turned in one direction, forces oil through passageway 20 in drive shaft sections 6 and 7 to move piston 14 forwardly that is, to the right in the drawings, and, when rotated in the other direction, forces oil through passageway 21 in the same shaft sections to move piston 14 rearwardly that is, to the left in the drawing.

By this arrangement, pump 15, passageways 20 and 21, and cylinder 15 form a high-pressure hydraulic system for actuating the pitch-setting mechanism for the propeller blades 12 which is completely enclosed within the propeller drive shaft 3. Should any leaks occur in this system or any seepage around packing glands take place, the resultant oil loss is replaced in a conventional manner (as by means of well known replenishing valves such as those shown and described in the hereinafter referred to publication) from a low pressure sump 22 such as through suitable pasageway 22' and supplied by a gravity feed reservoir 23. Replenishing oil is fed from reservoir 23 through a suitable low pressure rotating hydraulic joint 24. This replenishing oil also lubricates the propeller pitch-setting mechanism and actuating rod 13.

In the drawing, piston 14 is shown in its center or neutral position wherein it is effective to maintain the blades 12 of propeller assembly 1 in their zero pitch position. Forward movement of the piston, i. e., to the right in the drawing, serves to effect positive or ahead pitch of the propeller blades; whereas rearward movement of the piston serves to effect negative or astern pitch of the propeller blades. The actual position of the piston and hence, the actual pitch of the propeller blades 12 is provided exteriorly of propeller shaft 3 by means of a flanged ring or follow-up ring 25 slidably mounted on shaft section 5 and rigidly connected to a perforated flange extension 26 of piston 14 by means of rods 27 that pass through suitable stuffing boxes 28 in the cylinder wall.

In order to drive impeller 18 relative to the main drive shaft 3 to position piston 14, differential gearing means are provided. For this purpose drive shaft section 8 serves as the spider of a differential gearing system and houses a plurality of spider pinions or gears 30, 31 and 32, 33 secured to shafts 34, 35 rotatably mounted in drive shaft section 8. Gears 31, 33 mesh with a differential output gear 36 fixed to impeller drive shaft 19, the impeller shaft being suitably rotatably mounted in bearings in drive shaft section 8. Gears 30, 32 mesh with an internal gear cut in a sleeve 37 which is rotatably mounted on a reduced portion of drive shaft section 8 whereby relative rotation between drive shaft section 8 and sleeve 37 is provided. In this arrangement, drive shaft section 8 and sleeve 37 (drive shaft section 9) serve as the inputs of the differential mechanism, and gear 36 serves as the output of the differential, whereby movement of impeller 18 relative to impeller housing 17 effects pumping action in either direction dependent upon the direction of such relative movement.

It is to be noted that the propeller drive shaft sections 5, 6, 7, 8, 9 and 10 are all readily disassembled for maintenance and servicing purposes. For example, if it is desired to service or replace the pump 17, the connection between sections 6 and 7 and the connection between sections 10 and 11 are severed, and sections 7, 8, 9 and 10 are merely lowered or slid radially away from the remainder of the propeller shaft 3.

In order to control the pumping action of hydraulic pump 16, the system of the present invention includes a variable speed drive mechanism mounted externally of the propeller drive shaft 3 and preferably situated adjacent and between drive shaft section 8 and sleeve 37, the input end of the variable speed drive being driven directly from the drive shaft 3 (through drive shaft section 8) and the output end thereof being connected to drive sleeve 37. Although any suitable variable speed drive may be used, it is preferred to employ an hydraulic, variable-displacement drive of the "Vickers" type for this purpose. Such drives are considered well-known to those skilled in the art of hydraulic actuators and may be of the type shown and described on page 48 of Catalog 5001 issued by Vickers Inc., 1400 Oakman Blvd., Detroit 32, Michigan, and entitled "Vickers' Oil Hydraulic Pump and Controls." For the purpose of the present specification it is believed sufficient to note that such an hydraulic drive includes a variable hydraulic pump or A-end driven from a constant speed input source and serves to deliver oil through suitable conduits and valves to actuate an hydraulic motor or B-end connected to rotate an output shaft. In operation, the output speed of the motor end may be varied smoothly from zero R. P. M. to a speed substantially equal to the input speed of the pump end by adjustment of a stroke arm connected to adjust the position of the pump end, which adjustment varies the flow of oil in the system. Although the A- and B-ends may be physically separated with long hydraulic lines connecting them, the A- and B-ends of the hydraulic variable speed drive herein illustrated are housed together as an integral structure.

As applied in the propeller pitch control system of the present invention, the variable speed drive is indicated generally by reference character 40 and includes a variable displacement hydraulic pump or A-end 41 driven at a speed proportional to the speed at which the main drive shaft 3 is being driven by the ship's prime power source, that is, at a speed dependent upon the speed of rotation of the main drive shaft 3, through a V-belt 42 coupling main drive shaft section 7 and pulley 43 constituting the input to the variable speed drive 40. The A-end 41 is connected to a variable speed hydraulic motor or B-end 44 through suitable hydraulic lines, relief valves, replenishing valves, etc., the speed at which the B-end 44 is driven being dependent upon the angular orientation of the A-end relative thereto. The output of the B-end 44 comprises a pulley 45 coupled through a V-belt 46 with sleeve 37 whereby sleeve 37 will be driven at a speed corresponding to the output speed of the B-end 44 of the variable speed drive 40. The angular orientation of the A-end and therefore the output speed of the variable speed drive 40 is controlled by means of a push rod 47 through a bell crank 48 which is displaced by a control member or control shaft 49.

The variable speed drive 40 may be considered, for the present discussion, a variable speed ratio drive, that is, the control member 49, in positioning the A-end angular orientation, adjusts the speed ratio between the input and output pulleys of the variable speed drive 40 and thus the speed ratio between the main drive shaft 3 (section 8) and the sleeve 37 (section 9). If the hydraulic variable speed drive 40 drives the latter two sections at a 1:1 speed ratio, the relative rotation between these sections is zero and hence impeller 18 will have no rotation relative to its housing 17 since there is no rotation of the output gear 36 of the differential mechanism above described. On the other hand, if the variable speed drive 40 drives sleeve 37 and section 8 at other than a 1:1 ratio, relative rotation between the latter two sections will occur resulting in a net rotation of impeller 18 relative to its housing 17 through output gear 36 of the differential mechanism.

The control member or shaft 49 may be operated by any suitable control means. For example, it may be operated from the output of an automatic speed control device or any other automatic propeller pitch determining mechanism. However, in the embodiment of the invention illustrated, the position of shaft 49 is controlled manually from the ship's bridge or wheelhouse through a suitable remote control system. For this purpose the control means comprises a servomechanism having an input situated in the wheelhouse or other suitable location and an output connected to operate control member 49. The servomechanism herein illustrated comprises a manually settable ship's speed control lever 50 connected through the mechanical connection 51 to operate a potentiometer 52. Potentiometer 52 comprises two arms of a D. C. bridge network 53 whose other two arms comprise another potentiometer 54, the output of the bridge network being supplied to a suitable amplifier and preferably a magnetic amplifier illustrated schematically at 55. D. C. power is supplied to bridge network 53 through a ring demodulator 56 connected to a suitable source of alternating current supply 57. Bridge network 53 may include various other potentiometers for controlling the operation of the remote control servomechanism, for example, potentiometers 58 and 59 may be employed to adjust the input-output ratio of the servomechanism or to balance the bridge network 53 through a suitable adjusting or calibration knob 60. Also, a potentiometer 61 may be employed to adjust the gain or sensitivity of the servomechanism as by adjusting knob 62. The effects of the above adjustments, being conventional, will not be described in detail.

The output of magnetic amplifier 55 controls a differential relay 63 which, in turn, controls differential A. C. power to solenoids 64 and 65 which are arranged to position an hydraulic control valve 66. The control valve 66 may be of the type disclosed in U. S. Patent No. 2,466,041 to Peoples et al. and assigned to the same assignee as the present application. For the present purposes, it will be understood that control valve 66 controls the flow of high pressure hydraulic fluid from a suitable pump 67 and hydraulic lines 68 to one side or the other of a suitable hydraulic ram 69, return oil being conducted to a sump 70 through return lines 71. The output of hydraulic ram 69 operates to control the position of control shaft 49 coupled with the A-end of the hydraulic variable speed drive 40 through a suitable follow-up differential linkage arrangement 72 to be hereinafter more fully described in the following discussion of the operation of the propeller pitch control system of the present invention.

In describing the operation of the present invention, it will be assumed that the propeller blades are imparting no thrust to the ship, that is, the blades are in their neutral or zero thrust position. All of the elements of the system are illustrated in the drawing in this zero thrust position. Now, assume that it is desired to impart a forward thrust to the ship. The settable controller 50 is moved to the right thereby unbalancing the bridge network 53 and supplying a D. C. control signal to the magnetic amplifier 55, the output thereof energizing differential relay 63. Differential relay 63 controls alternating current energy supplied to the control valve solenoids 64, 65 in such a manner as to move the control valve to the left thereby supplying high pressure oil from supply pump 67 to the left-hand side of ram 69 resulting in movement of the ram piston 69' to the right. It is to be understood that in the present system the angular pitch adjustment of the propeller blades 12 corresponds to the linear displacement of ram 69' which, in turn, of course, is determined by the magnitude of the displacement of control lever 50. In order that the linear displacement of the ram piston 69' corresponds exactly to the displacement of lever 50, a displacement follow-up signal is generated at potentiometer 54 upon displacement of ram piston 69', which signal is fed back in a degenerative fashion in the bridge network 53. The position of the potentiometer 54 is made to correspond exactly with the position of the ram cylinder 69' by means of a suitable rack and pinion drive 73, the pinion being connected through suitable mechanical connections 74 to actuate potentiometer 54.

As ram piston 69' moves to the right, differential lever 72 pivots about point 75 on follow-up ring 25 (no movement of the pitch adjusting shaft 13 has yet occurred) thereby moving control shaft 49 to the right and causing the A-end 41 to move downwardly. Such downward movement of the A-end 41 decreases the speed of rotation of B-end 44 and hence, pulley 45 and sleeve 37. In other words, the main drive shaft section 8 and sleeve 37 are no longer rotating at a 1:1 speed ratio but, on the other hand, sleeve 37 is now rotating slower than drive shaft section 8 thereby imparting relative rotation between impeller 18 and its housing 17 through differential output gear 36. The impeller 18, and differential gearing 30, 31, 32, 33 and 36, are so designed that when sleeve 37 is being driven at a speed less than drive shaft section 8, the impeller supplies high pressure oil to the left-hand end of cylinder 15 through passageway 20 to impart a forward movement of piston 14. As above stated, forward movement of piston 14 will cause propeller blades 12 to move in such a direction as to impart a forward thrust to the ship.

As piston 14 moves forward under the influence of the oil pressure supplied by pump 16, follow-up ring 25, which is positioned in accordance with piston displacement by means of rods 27, moves differential lever 72 clockwise about its connection 76 with differential lever 72. At this point in the operation the ram piston 69' is considered fixed and acts as a pivot for differential lever 72. Such follow-up motion of differential lever 72 will cause control lever 49 to move rearwardly, that is, to the left in the drawings, thereby returning the A-end to its original position whereby to reestablish the 1:1 speed ratio between drive shaft section 8 and sleeve 37. Thus, the pump 16 stops and forward movement of the piston 14 is arrested. With the follow-up arrangement just described, it will be seen that the pitch of the propeller blades 12 will correspond exactly to the linear displacement of ram piston 69', the position of the latter in turn corresponding to the position of control lever 50. Although the steps in the operation of the present invention are discussed as separate operations, it will be understood that these steps, in practice, occur smoothly with no abrupt movements.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. Apparatus for varying the pitch of the blades of a variable pitch propeller through the pitch-setting mechanism of said propeller comprising, a main propeller drive shaft, a hydraulic cylinder arranged therewithin, a piston slidably disposed within said cylinder and adapted for connection with said pitch-setting mechanism, a source of high-pressure hydraulic fluid housed within said drive shaft and adapted to supply controlled high-pressure fluid to said cylinder for operating said piston whereby to operate said pitch-setting mechanism, a differential mechanism carried by said drive shaft having a first input member driven by and synchronously with said drive shaft, a second input member coaxially mounted for rotation on said drive shaft and adapted to be driven at various speeds, and an output member connected to control said source upon differential driving speeds of said input and output members of said differential, a hydraulic variable speed drive mechanism mounted exteriorly of said propeller drive shaft and having an input drive and an output drive, said input drive being coupled with said main drive shaft for synchronous rotation therewith and said output drive being conneced to rotate said coaxial member, and control means coupled with said variable speed drive for controlling the input and output speed ratio thereof whereby to control the differential drive speeds between said main drive shaft and said coaxial member.

2. Apparatus of the character set forth in claim 1 wherein said source of high-pressure hydraulic fluid comprises a reversible hydraulic pump housed within said drive shaft and wherein the output of said differential mechanism is connected to drive said pump upon differential drive speeds between said main drive shaft and said coaxial member.

3. Apparatus of the character set forth in claim 1 wherein said control means for said variable speed drive mechanism comprises a position follow-up servomechanism including a signal-responsive servomomotor connected to said variable speed drive mechanism for adjusting the input-output speed ratio thereof, a remote manual controller for providing an electrical signal proportional to a function of propeller pitch, a follow-up member for supplying an electrical follow-up signal corresponding to the position of said servomotor, means connected to receive said signals for supplying an output signal corresponding to the difference therebetween, and means for supplying said output signal to said servomotor whereby said servomotor is positioned in accordance with the position of said manual controller.

(References on following page)

References Cited in the file of this patent

UNITED STATES PATENTS

| | | |
|---|---|---|
| 2,296,929 | Ifield | Sept. 29, 1942 |
| 2,332,436 | Campbell | Oct. 19, 1943 |
| 2,618,175 | Bruce | Nov. 18, 1952 |
| 2,661,807 | Fielding | Dec. 8, 1953 |

FOREIGN PATENTS

| | | |
|---|---|---|
| 907,453 | France | June 25, 1945 |

OTHER REFERENCES

American Society of Naval Engineering Journal, vol. 52, 1940; "Controllable pitch propellers," by J. H. Strandell, pp. 427–432.